United States Patent [19]
Dahlby et al.

[11] Patent Number: 5,175,735
[45] Date of Patent: Dec. 29, 1992

[54] METHOD AND APPARATUS FOR HANDLING OBJECT FAULTS IN AN ELECTRONIC REPROGRAPHIC PRINTING SYSTEM

[75] Inventors: Karen L. Dahlby, Rochester; Elizabeth A. Bennett, Penfield; John F. Gauronski, Rochester; Robert W. Hurtz, Victor; Alane H. Rowold, Rochester, all of N.Y.

[73] Assignee: Xerox Corporation, Stamford, Conn.

[21] Appl. No.: 589,761

[22] Filed: Sep. 28, 1990

[51] Int. Cl.$^5$ .............................................. G01R 31/28
[52] U.S. Cl. .................................. 371/16.4; 355/205; 395/575
[58] Field of Search .............................. 371/16.4, 16.1; 395/575; 355/204, 205, 206, 207

[56] References Cited

U.S. PATENT DOCUMENTS

| | | | |
|---|---|---|---|
| 3,838,260 | 9/1974 | Nelson | 371/16.1 |
| 4,310,235 | 1/1982 | Lorenzo et al. | 355/14 R |
| 4,514,846 | 4/1985 | Federico et al. | 371/16.5 |
| 4,745,602 | 5/1988 | Morrell | 371/12 |
| 4,888,771 | 12/1989 | Benignus et al. | 371/16.1 |
| 4,977,500 | 12/1990 | Ogata et al. | 395/575 |
| 5,023,779 | 6/1991 | Federico et al. | 371/16.4 |
| 5,107,299 | 4/1992 | Farrell et al. | 355/207 |

Primary Examiner—Charles E. Atkinson
Attorney, Agent, or Firm—Oliff & Berridge

[57] ABSTRACT

A method and apparatus for handling software object faults in an electronic reprographic system for scanning and synchronously or asynchronously processing and printing a plurality of jobs are described. The system is monitored for the occurrence of software object faults in a job, and when such faults are identified, the operator is informed of such software object faults prior to processing of the object. The system is provided with the means to process another object without operator intervention prior to correction of the faulted object, and to proceed with processing the faulted object after correction of the fault.

10 Claims, 11 Drawing Sheets

FIG. 7

METHOD AND APPARATUS FOR HANDLING OBJECT FAULTS IN AN ELECTRONIC REPROGRAPHIC PRINTING SYSTEM

BACKGROUND OF THE INVENTION

1. Field of the Invention

The present invention relates to a system of electronic reprographics and, more particularly, to a method and apparatus for handling object faults in an electronic reprographic system.

2. Description of the Related Art

In electronic reprographic printing systems, a complex series of interactions occurs between the software services and objects and the hardware functions to provide the printed or otherwise processed end-product. In such a system, a document or series of documents comprising at least one print job are successively scanned, resulting in image signals which electronically stored. The signals are later read out successively and transferred to a printer for formation of the images on paper. Such a document can be printed any number of times or processed in any number of ways (e.g., words deleted or added; image magnified or reduced, etc.). If a plurality of documents comprise a job which is being processed, the processing or manipulation of the documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the job to be printed may be different from the order of jobs as scanned depending on the priority of the jobs and the desires of the operator for increasing productivity or through-put and decreasing printer or scanner down-time.

In such a system, the occurrence of faults on all levels of functioning can occur. Software object faults may occur to result in such faults as illegal job parameters, corrupted data, resource problems, input master errors, font problems, etc. Mechanisms for dealing with such faults are an integral and necessary component of the system, because such faults will result in the interruption of the system, and possibly a crash of the system which requires that the system be rebooted. Information from the system provided to the operator directing the operator to the fault or faults causing the job interruption is critical to the efficient operation of the system.

The related art has disclosed printing systems which provide object fault handling systems.

U.S. Pat. No. 4,745,602 to Morrell discloses a printer error and control system wherein errors are classified as either fatal or nonfatal system errors. A host terminal for the printer controls the printer and keeps track of errors. A fault light illuminates when an error occurs, and an error code is displayed. When a fatal error occurs, all functions within the printer are stopped until the fault is cleared.

U.S. Pat. No. 3,838,260 to Nelson discloses a microprogrammable control memory diagnostic system wherein fault reporting occurs continuously and is performed concurrently with normal program execution in a time-shared fashion. An error log is used to store error information which includes date and time of error, a job number affected by the error and a program status word and fault register content.

U.S. Pat. No. 4,514,846 to Federico et al. discloses a fault detection system which monitors the control of software crashes in a multiprocessor machine control system to prevent machine malfunctions, and provides a diagnostic path that isolates a particular control element in a multi-element control that contains a fault and then to a more comprehensive recording of the fault history for each individual control element.

U.S. Pat. No. 4,888,771 to Benignus et al. discloses a diagnostic configuration management system for a data processing system wherein failing options are isolated during a system checkout, a selected option checkout, or by resolving a missing option in the present configuration.

While the related art provides for the routine testing for and detection of errors and the recording of such errors in an error log, and for providing the operator with instructions regarding how to clear the fault, the prior art fails to disclose a mechanism which permits the system to report, and to allow clearance of, faults which occur in background functions that are transparent to the operator. Such a mechanism is desirable, because the detection and reporting of problems prior to a job's entry into the printer will prevent the necessitated cycle-down and the subsequent decrease in productivity. Furthermore, it is desirable that the operator be informed of faults in the system in such a manner that the operator can deal with the fault in a non-real time manner. This would allow the system to move on to a different job without requiring operator intervention, with the operator having the capability of fixing the problem at a more convenient time.

OBJECTS AND SUMMARY OF THE INVENTION

Accordingly, one object of the present invention is to provide an electronic reprographic system which displays to the operator a fault occurring in the background functions controlled by the software that are transparent to the operator.

Another object of the present invention is to provide an electronic reprographic system which provides instructions to the operator for clearing the fault.

Another object of the present invention is to provide an electronic reprographic system which contains such instructions to the operator in a special menu advising how a job may be performed using alternate system functions where possible.

A further object of the invention is to display a menu showing all other related faults together with fault descriptions, page where faults occur, fault code, and clearance procedure for these other faults.

To achieve the foregoing and other objects, and to overcome the shortcomings discussed above, an electronic reprographic system for printing a job is provided which monitors the system for the occurrence of faults, informs the operator of such faults prior to processing and printing of the jobs transmitted to the system, permits the system to process another job without operator intervention in the event of a fault occurring in a job, provides the operator with information regarding the correction of such faults by means of a display of instructions which may be provided in a special menu option on the user interface, and permits the operator to correct such faults at a time which will not interfere with the maximum efficiency of the printing system.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface (UI) touchscreen of the printing system shown in FIG. 1;

DETAILED DESCRIPTION OF THE PREFERRED EMBODIMENTS

A. The System

Figure 1:
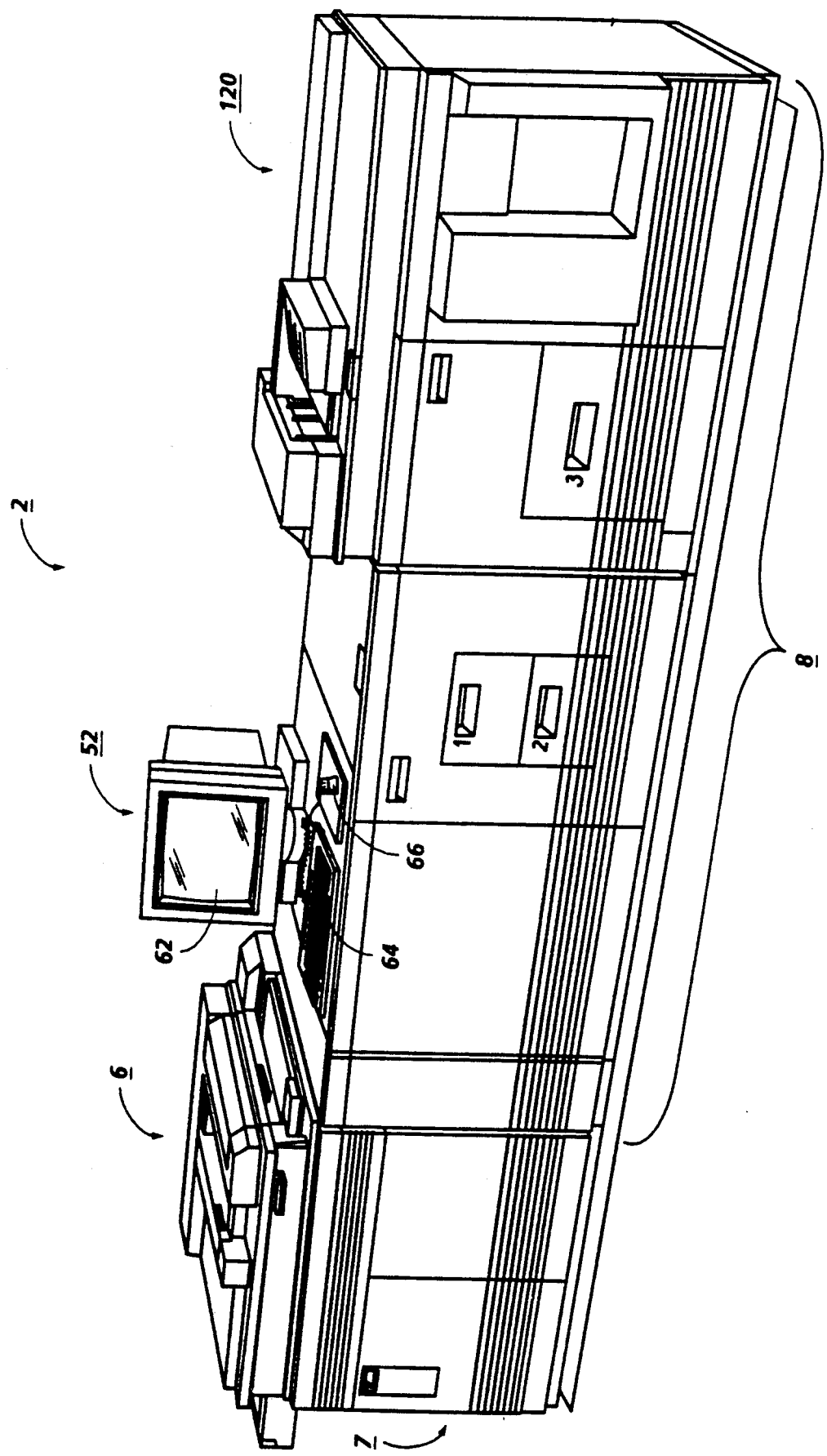
FIG. 1 is a view depicting an electronic printing system incorporating the print media identification system of the present invention.
Figure 2:
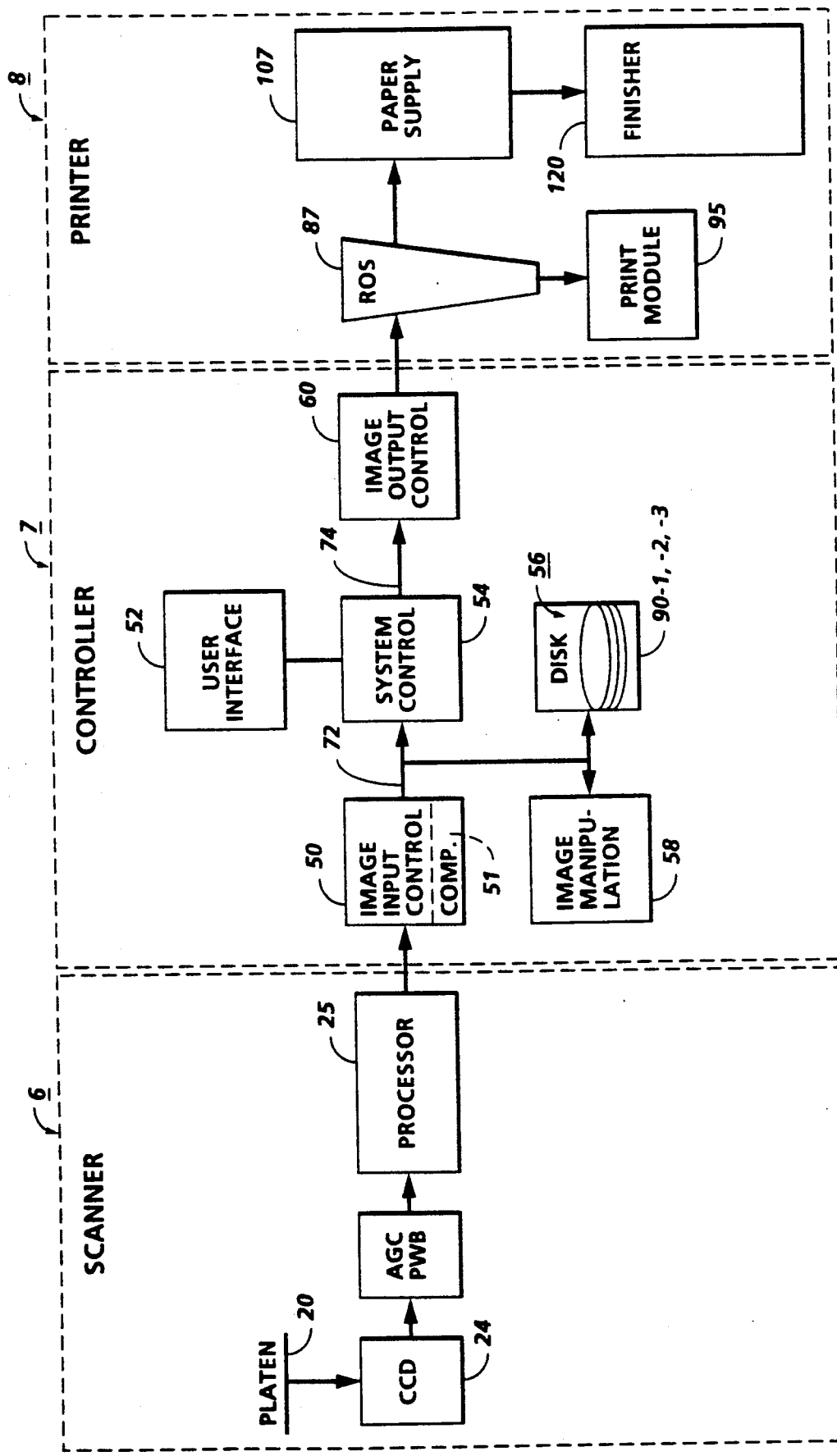
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
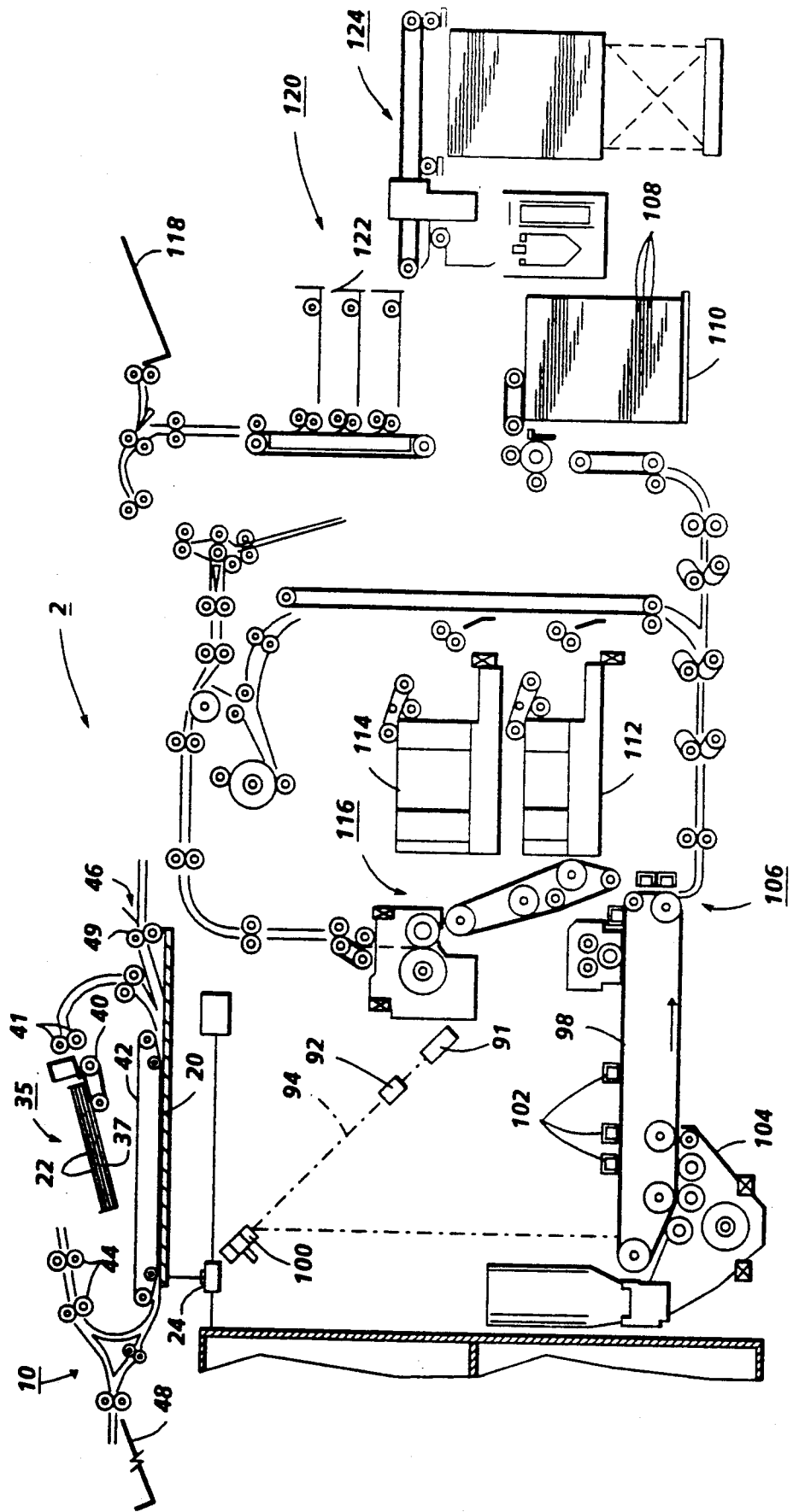
FIG. 3 is a plan view illustrating the principal mechanical components of the printing system shown in FIG. 1.
Figure 4:
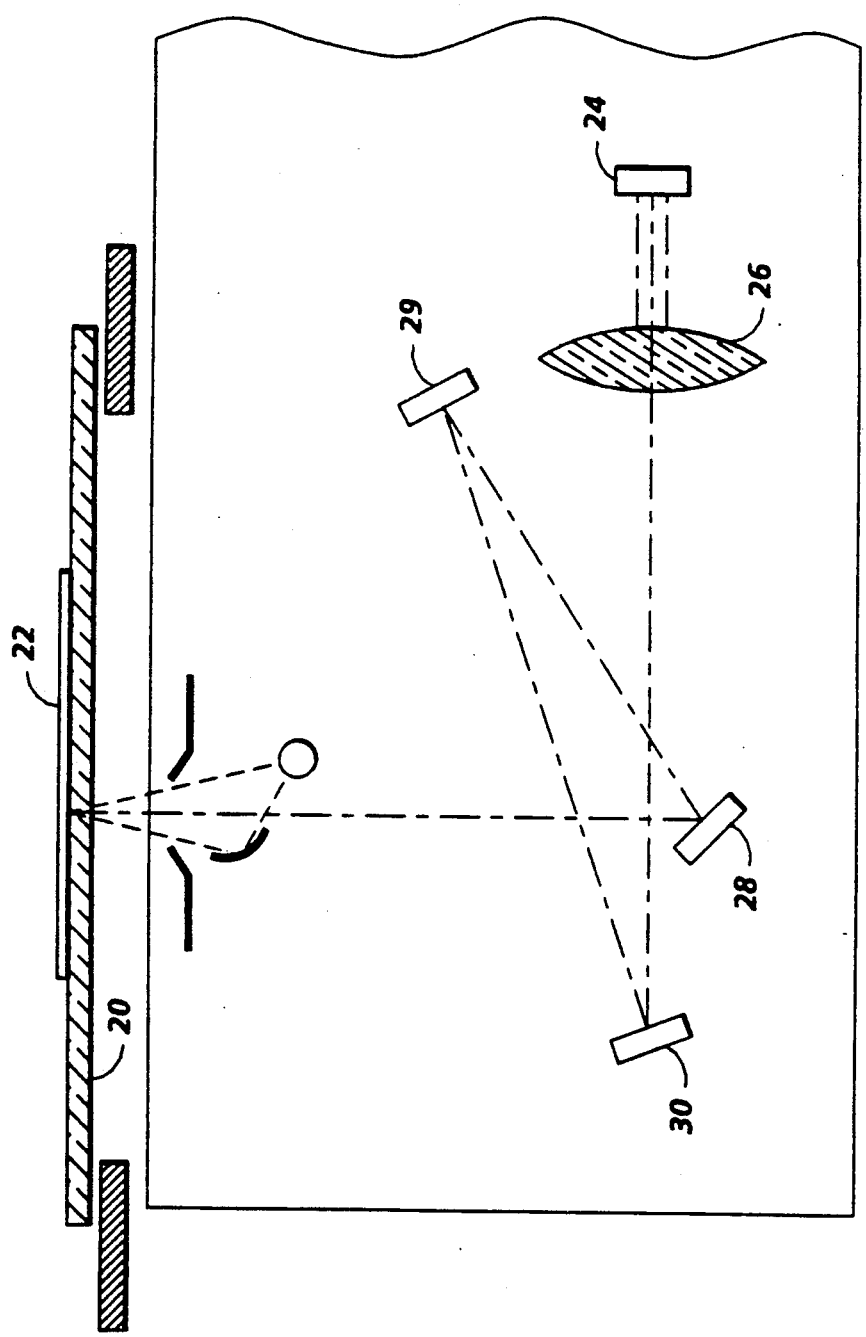
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 2 and 5, controller section 7 is, for explanation purposes, divided into an image input controller 50, User Interface (UI) 52, system controller 54, main memory 56, image manipulation section 58, and image output controller 60.

Figure 5A:
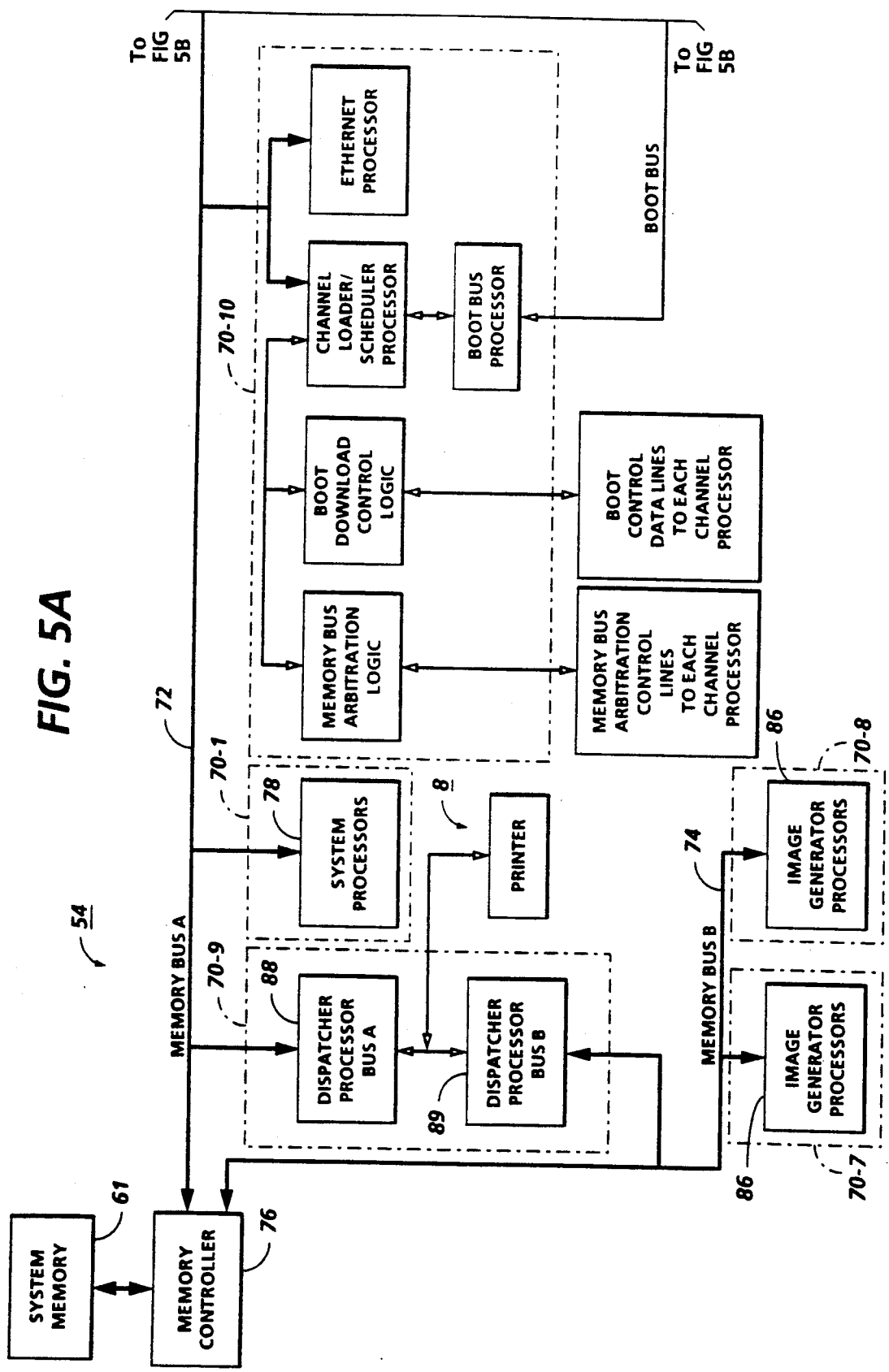
FIGS. 5A, 5B, and 5C comprise a schematic block diagram showing the major parts of the control section for the printing system shown in FIG. 1.
Figure 5B:
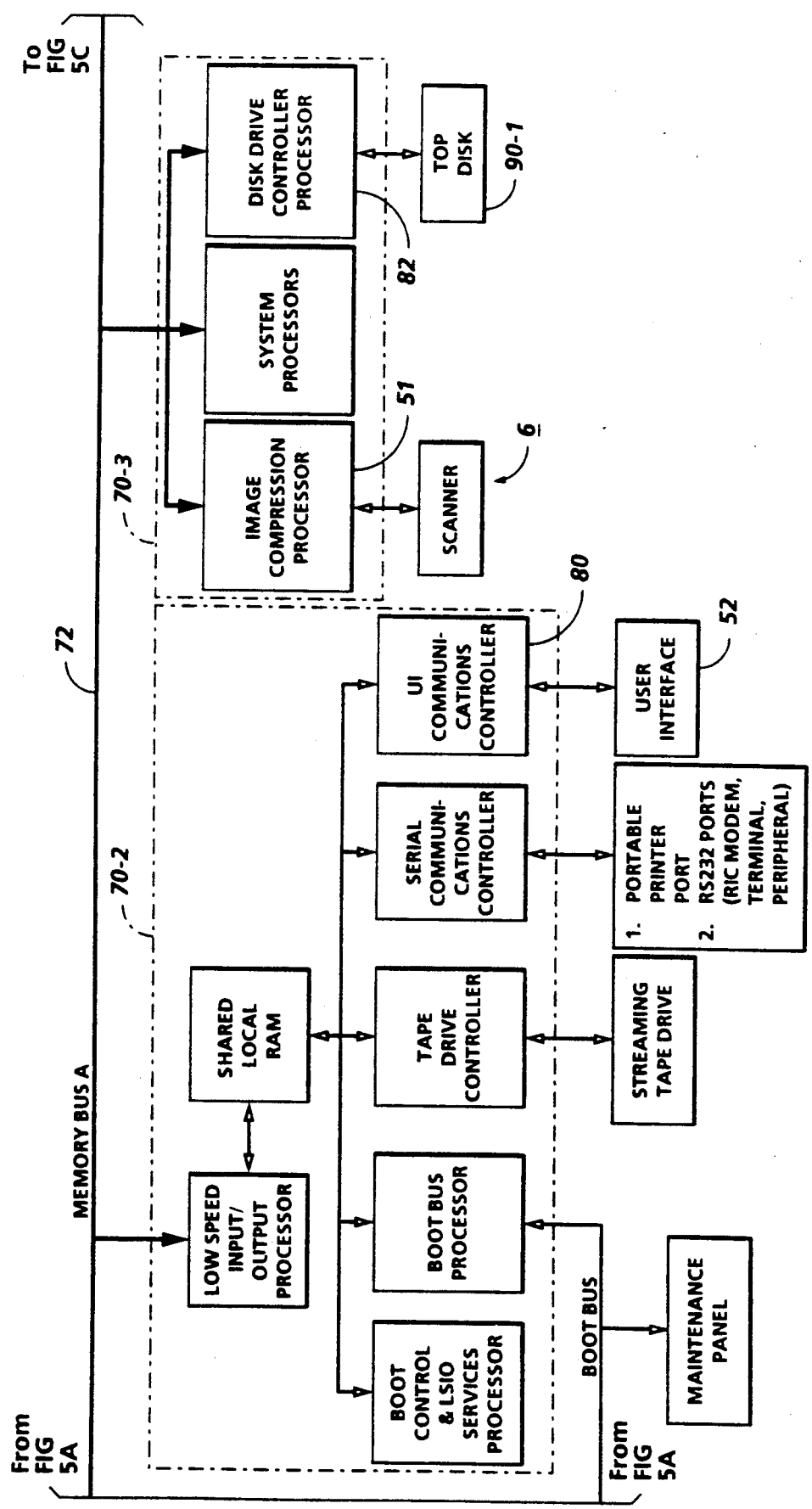
Figure 5C:
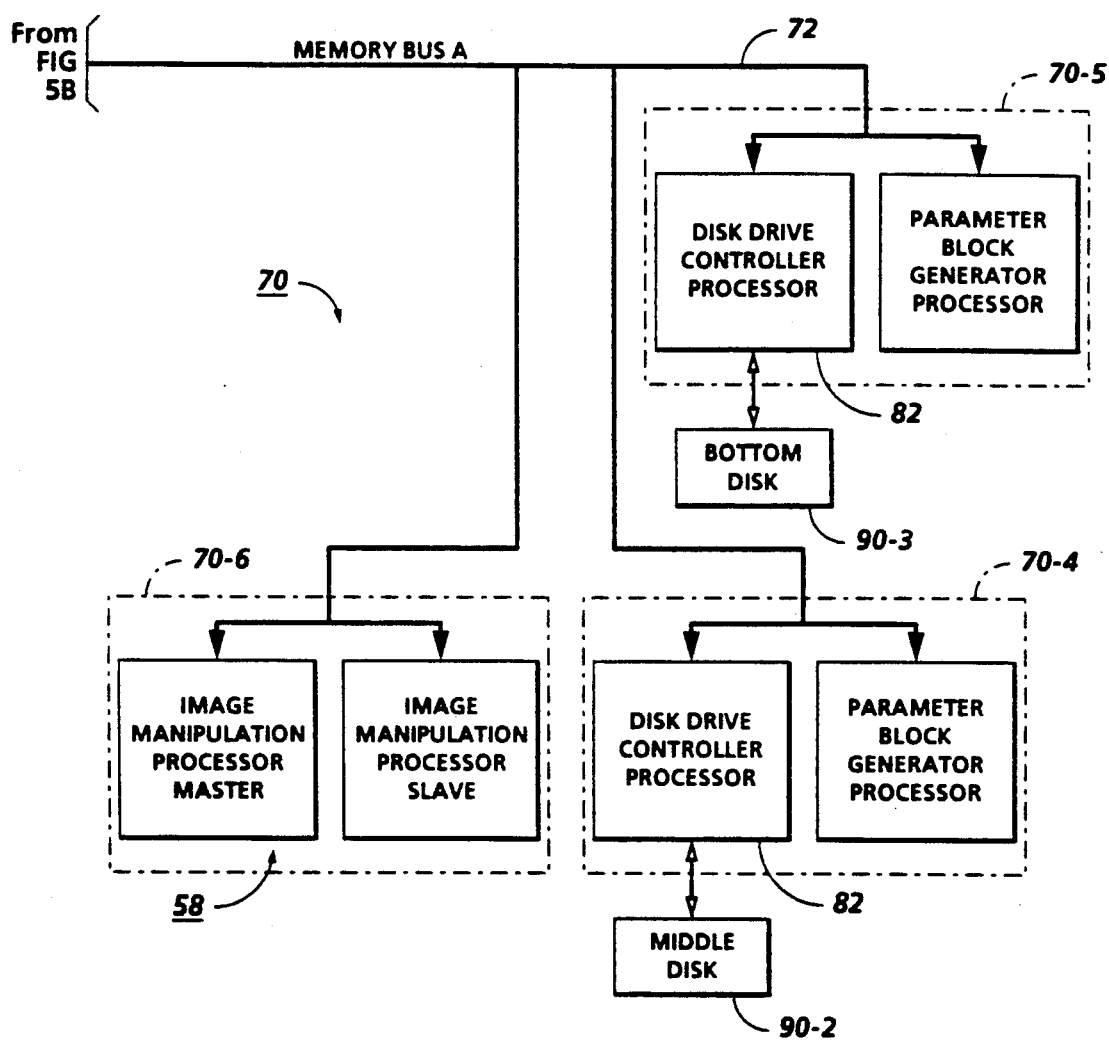

Referring particularly to FIGS. 5A–5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
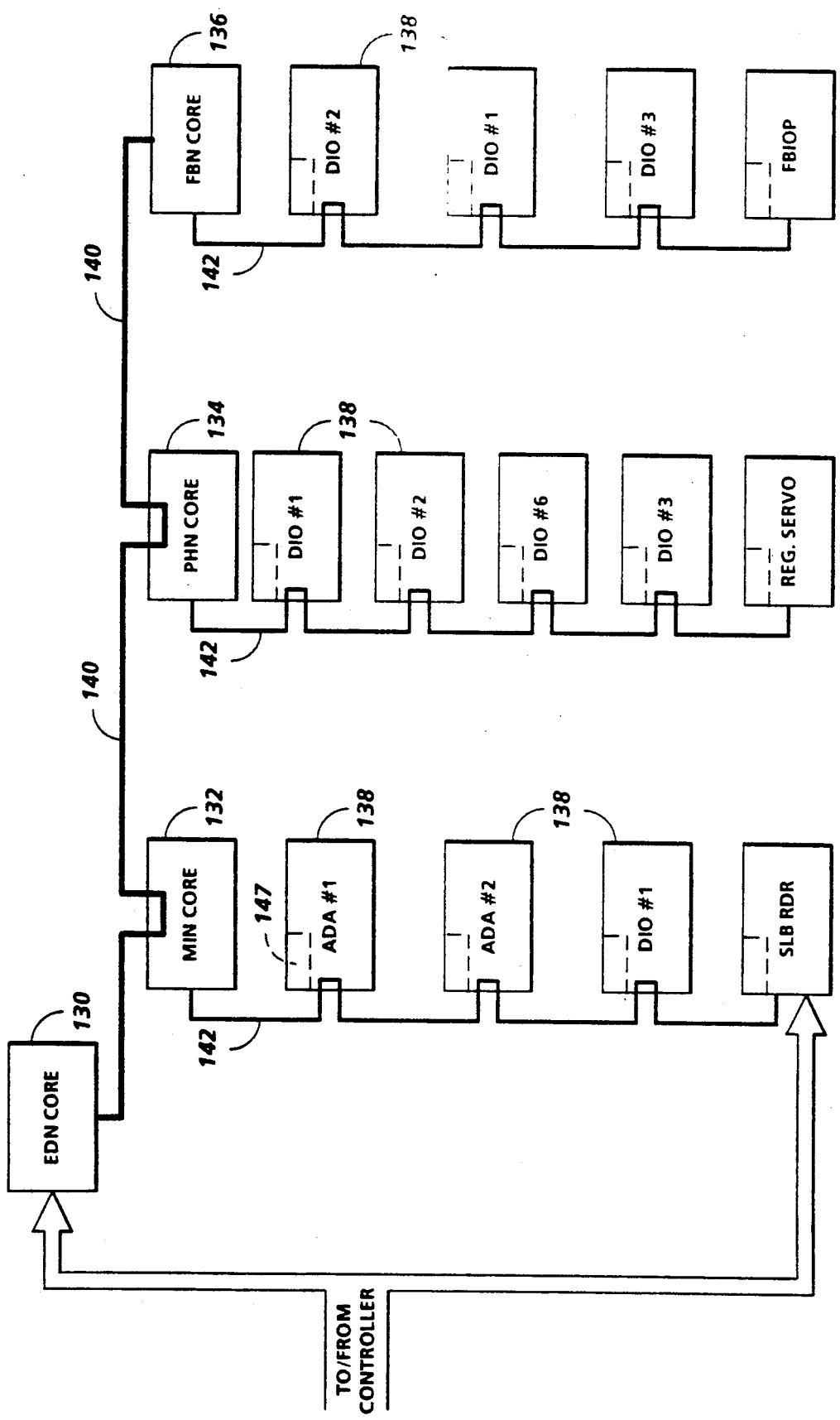
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining Core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
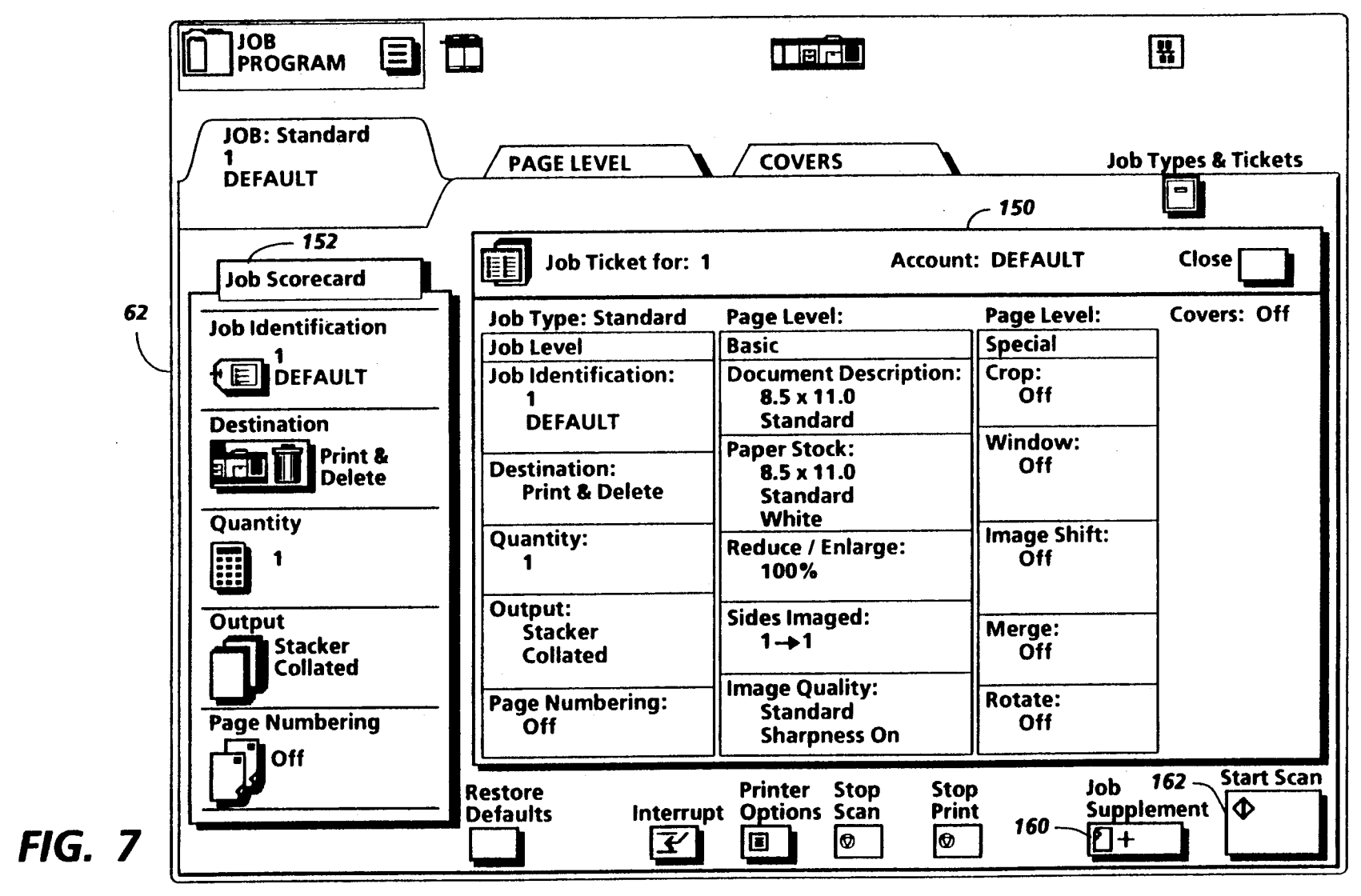
Figure 8:
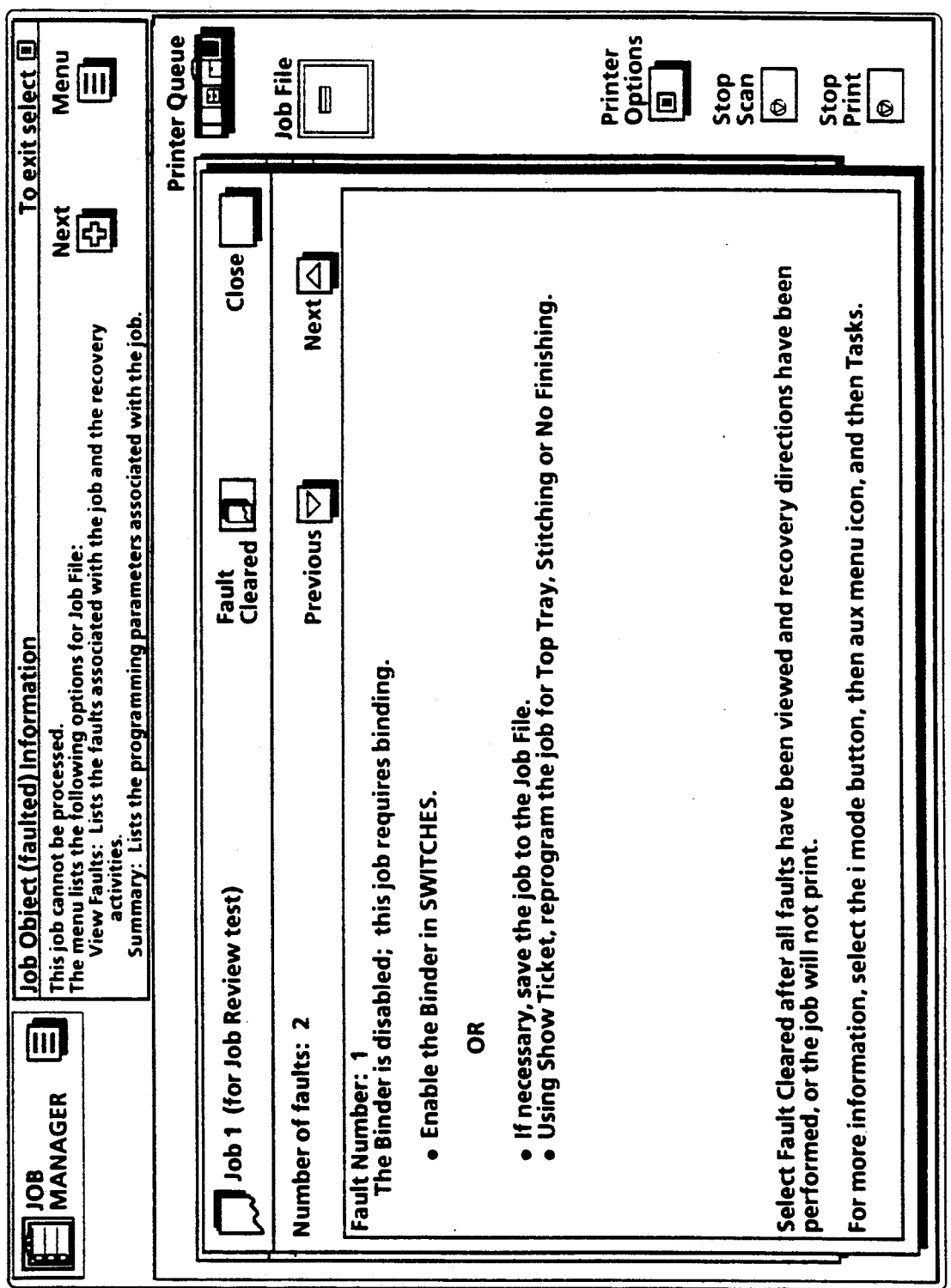
FIG. 8 is a view depicting an exemplary job managing ticket displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. Referring to FIG. 8, Job Manager (154) displays the status of a job, including any related faults, being processed in the system.

B. Object Faults

A fault or crash is an unpredictable condition in any part of the system 2 which causes a subset of the system elements related to the hardware and/or software to become unavailable to the operator. Some examples:

At the system level: Where a reboot (restart of the system after a crash which could be initiated by the system or through an operator intervention at UI 52) or a repowering (initiated by an operator only, but could include a loss of power) occurs.

At the system element level: Where the system attempts to recover automatically by reinitializing or resoftloading the system element. Additionally, during certain fault recovery procedures, the operator may cause the system to reinitialize or resoftload the system elements to achieve recovery.

At the hardware level: When the hardware of the system fails or becomes inoperative.

The system includes a crash recovery operation which will return the system elements to a functional state after a crash has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order.

Categories of crashes which occur in system 2 include:
1) those that the operator can perceive, but are automatically recoverable;
2) those which cause the system to automatically recover to a certain level, but which also require the operator to assist in order to finish recovery; and
3) those in which the system cannot automatically recover, and which require the operator to initiate the process of recovery (e.g., booting cycling power).

When a fault occurs in a software object (i.e., jobs, merge items), the following recovery procedure occurs. The object is marked as faulted when the problem is detected, and information necessary for operator clearance is added to the object. The system 2 automatically aborts all services which are actively working on the object. (For example, if a job is stream printing, i.e., printing a portion of a job while scanning another portion of the same job, and scan detects the problem, printing is stopped also.)

Some examples of objects faults include illegal job parameters (e.g., specification of binding for a one page job); corrupted data (e.g., an image on a job page is bad); resource problems (e.g., a job page is too complex to print); IP master errors (e.g., an incoming net job has problems in the master); and font problems (e.g., a font needed by a job is not currently loaded).

The system then notifies the operator of the faulted object problem in two ways. First, the object icon displayed in the queue on the Job Manager changes to a torn icon. Second, depending upon which queue the job is in, a "Faulted job in printer queue" or "Faulted job in job file" message is displayed via the status handler. See FIG. 8.

While an object is faulted, many of the standard operations cannot be performed on it (e.g., copy, move, proof). When a faulted objected is selected, special menus on the UI 52 are then provided, eliminating invalid options.

A special menu option allows the operator to view all faults which are associated with an object at UI 52. Such information includes a description of the problem, the page on which the problem occurred, the unique service code associated with the fault, and specific clearance procedures for each fault. Where there are multiple faults associated with one object, this information is provided for each fault, and the type of information provided with each fault may be different.

When the operator has followed all clearance procedures, the "Fault Cleared" command must be selected through the UI 52 to indicate to the system 2 that the object is no longer faulted. All standard menu options are restored to the object, and the system 2 will automatically resume processing. For example, if a job faulted in the printer queue, when the object faults are cleared, the job is automatically resubmitted to formatting/printing. If problems had been detected during font substitution, the substitution is resumed upon clearance of the object faults.

Figure 9:
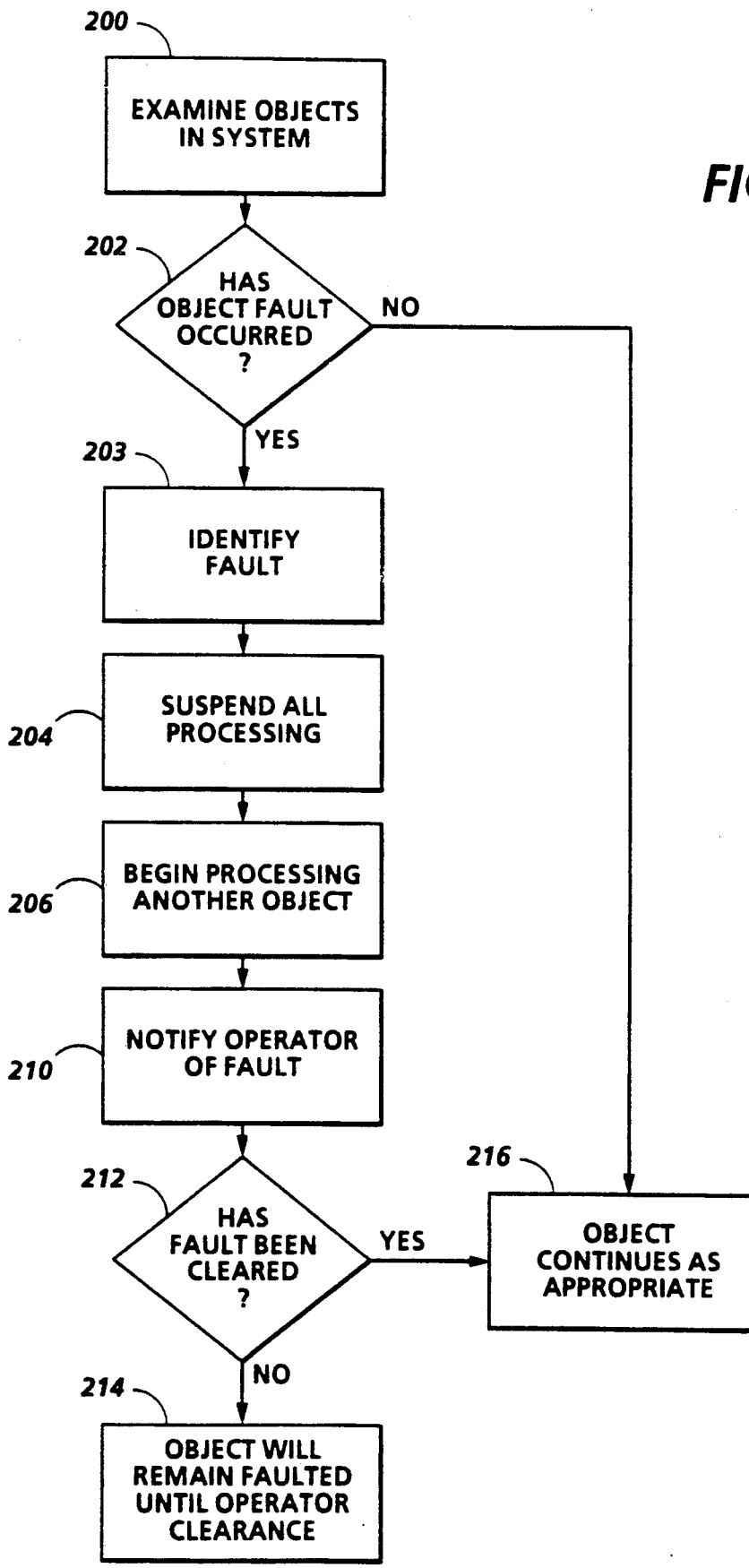
FIG. 9 is a flowchart depicting the operation of the FIG. 1 system upon the detection of an object fault according to the present invention.

The invention is summarized in FIG. 9. FIG. 9 depicts a flowchart of the operation of system 2 wherein the examination of objects in the system (Step 200) occurs within system 2 by interaction of the data base located in the controller section 7 with the objects. The data base continuously evaluates whether an object fault has occured (Step 202). If not, the object is processed as instructed. If so, the fault is identified (Step 203), the processing of the object is suspended (Step 204) and the system will proceed to process another object (Step 206). The fault-specific information passed within the system to the scheduler within controller section 7 notifies the operator (Step 210) that the object is faulted. The system continues to evaluate the existence of faults (Step 212) and in the event of input that the object is once again available for processing, the object continues as appropriate (Step 216). If the fault is not cleared, the object will remain faulted until it is cleared by the operator (Step 214.)

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for handling object faults in an electronic reprographic system for scanning and synchronously or asynchronously processing and printing a plurality of jobs, comprising the steps of:
   monitoring the system for the occurrence of at least one object fault in a job;
   identifying said fault;
   informing an operator of said object fault prior to processing and printing of said one job, and;
   permitting the system to process another job in the plurality of jobs without operator intervention prior to correction of said fault in said one job.

2. The method of claim 1, further comprising the step of permitting the system to process said one job after correction of said fault.

3. The method as recited in claim 1, wherein the step of informing the operator includes displaying instructions to the operator for clearing said fault.

4. The method as recited in claim 3, wherein the display step includes the step of allowing the operator to view the instructions and all said faults associated with the faulted job on a user interface.

5. The method as recited in claim 4, further comprising the step of providing a special menu option on the user interface is provided to allow the operator to view all said faults associated with the job.

6. An apparatus for handling object faults in an electronic reprographic system for scanning and synchronously or asynchronously processing and printing a plurality of jobs, comprising:
   means for monitoring the system for occurrence of at least one object fault in a job;
   means for identifying said fault;
   means for informing an operator of said fault prior to processing and printing of said job; and
   means for permitting the system to process another job in the plurality of jobs without operator intervention prior to correction of said fault in said one job.

7. A means for permitting the system to process another job in the plurality of jobs without operator intervention prior to correction of said fault in said one job.

8. The apparatus as recited in claim 6, wherein the means for informing the operator includes the means for displaying instructions to the operator for clearing said fault.

9. The apparatus as recited in claim 8, wherein the display means includes means for allowing the operator to view the instructions and all said faults associated with the faulted job on a user interface.

10. The apparatus as recited in claim 9, wherein a special menu option on the user interface is provided to allow the operator to view all said faults associated with the job.

* * * * *